(12) United States Patent
Carvalhosa

(10) Patent No.: US 12,009,969 B2
(45) Date of Patent: Jun. 11, 2024

(54) METHODS AND DEVICES FOR NOTIFICATION WITH IMPROVED RELIABILITY

(71) Applicant: Schreder S.A., Brussels (BE)

(72) Inventor: Sérgio Carvalhosa, Liège (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 17/997,767

(22) PCT Filed: May 4, 2021

(86) PCT No.: PCT/EP2021/061714
§ 371 (c)(1),
(2) Date: Nov. 2, 2022

(87) PCT Pub. No.: WO2021/224247
PCT Pub. Date: Nov. 11, 2021

(65) Prior Publication Data
US 2023/0171150 A1  Jun. 1, 2023

(30) Foreign Application Priority Data

May 4, 2020 (NL) .................................... 2025499

(51) Int. Cl.
*H04L 41/069* (2022.01)
*H04L 41/0816* (2022.01)
*H04L 67/12* (2022.01)

(52) U.S. Cl.
CPC ........ *H04L 41/069* (2013.01); *H04L 41/0816* (2013.01); *H04L 67/12* (2013.01)

(58) Field of Classification Search
CPC .... H04L 41/069; H04L 41/0816; H04L 67/12
See application file for complete search history.

(56) References Cited

U.S. PATENT DOCUMENTS 8,862,393 B2 * 10/2014 Zhou ..................... G08C 17/02
340/506
9,800,667 B2 * 10/2017 Maturana .............. H04L 67/125
(Continued)

FOREIGN PATENT DOCUMENTS

EP  2704401 A1  3/2014
WO  2018013916 A1  1/2018

OTHER PUBLICATIONS

PCT International Search Report and Written Opinion, Application No. PCT/EP2021/061714, dated Jul. 2, 2021, 12 pages.
(Continued)

*Primary Examiner* — S M A Rahman
(74) *Attorney, Agent, or Firm* — McDonnell Boehnen Hulbert & Berghoff LLP

(57) ABSTRACT

Example embodiments relate to methods and devices for notification with improved reliability. One embodiment includes a method for providing notifications by a client device to a server device. The method includes performing, by the client device, a series of steps. The steps include receiving, for at least one variable to be monitored by the client device, one or more predefined configuration parameters. The steps also include setting or modifying a configuration of the client device to notify values for the at least one variable in accordance with the received one or more predefined configuration parameters. Further, the steps include, based on the set or modified configuration of the client device, notifying one or more values for the at least one variable to the server device.

22 Claims, 7 Drawing Sheets

(56) References Cited

U.S. PATENT DOCUMENTS

2008/0046505 A1* 2/2008 Netsch .................... H04L 69/28
                                                        709/203
2018/0082565 A1* 3/2018 Braiman ................ G08B 25/14
2019/0215767 A1* 7/2019 Soloway ........... H04W 52/0216

OTHER PUBLICATIONS

Net SNMP Tutorial—TRAPs vs INFORMs for SNMPv3, version 5.9.2, Alex Burger, XP093114405, downloaded from http://www.net-snmp.org/tutorial/tutorial-5/commands/snmptrap-v3.html on Dec. 21, 2023, 2 pages (Aug. 1, 2018).

"Object Definitions for Electrical and Lighting Management Systems (ELMS)", NTCIP 1213 version v02, National Transportation Communications for ITS Protocol, published Mar. 2011, 178 pages, downloaded from https://www.ntcip.org/file/2018/11/NTCIP1213v02.pdf on Dec. 21, 2023 (Mar. 1, 2011).

* cited by examiner

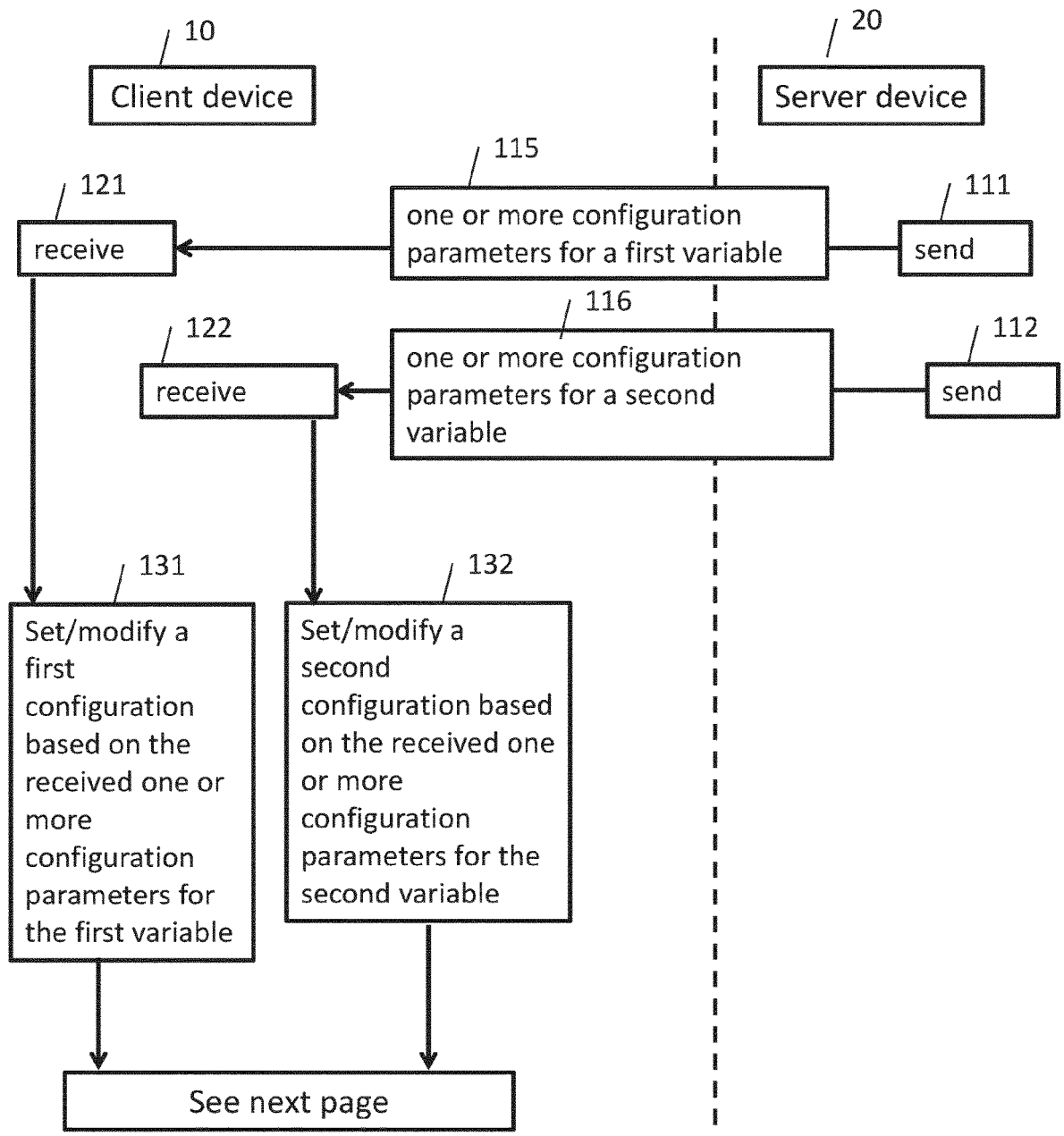

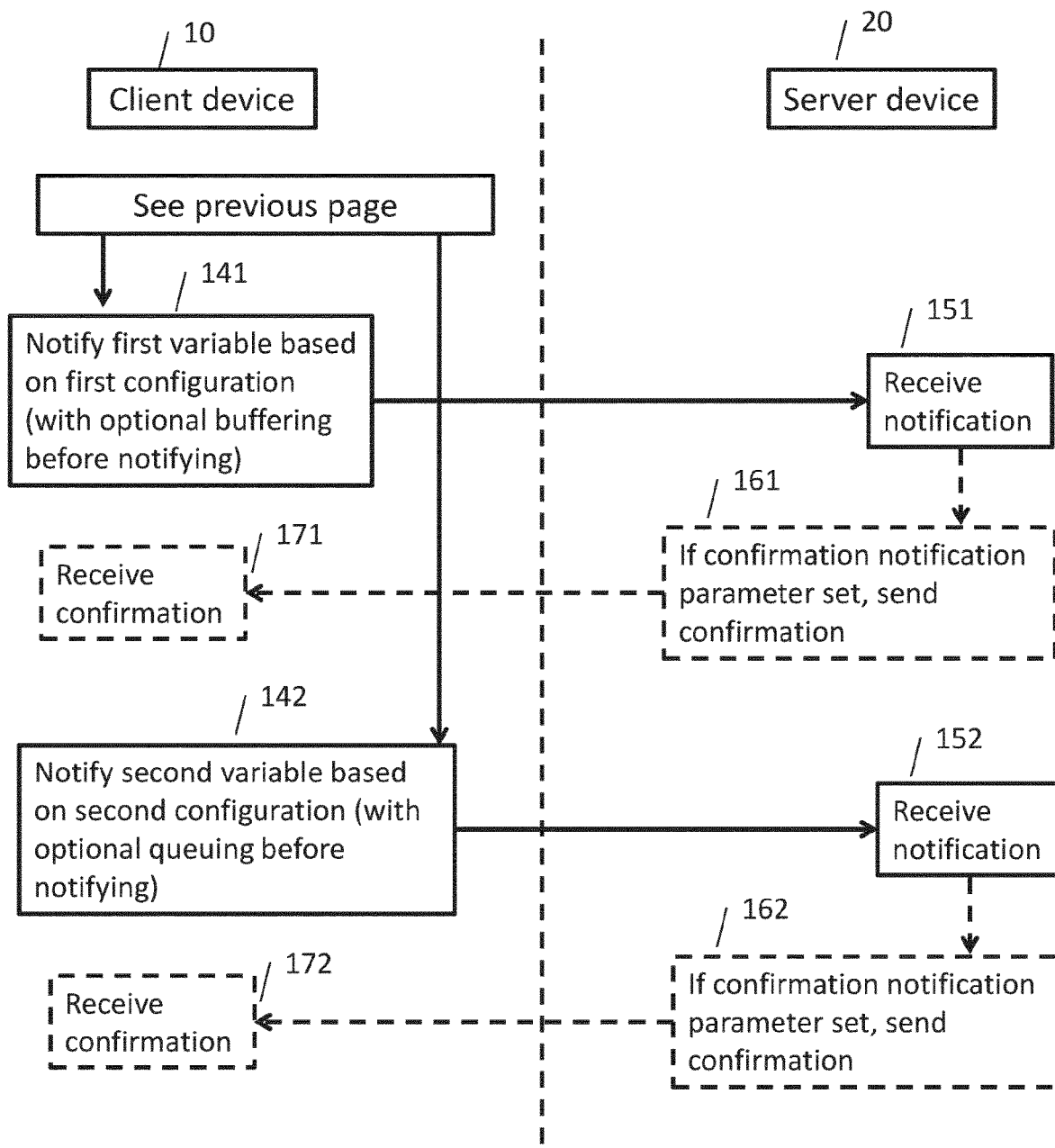

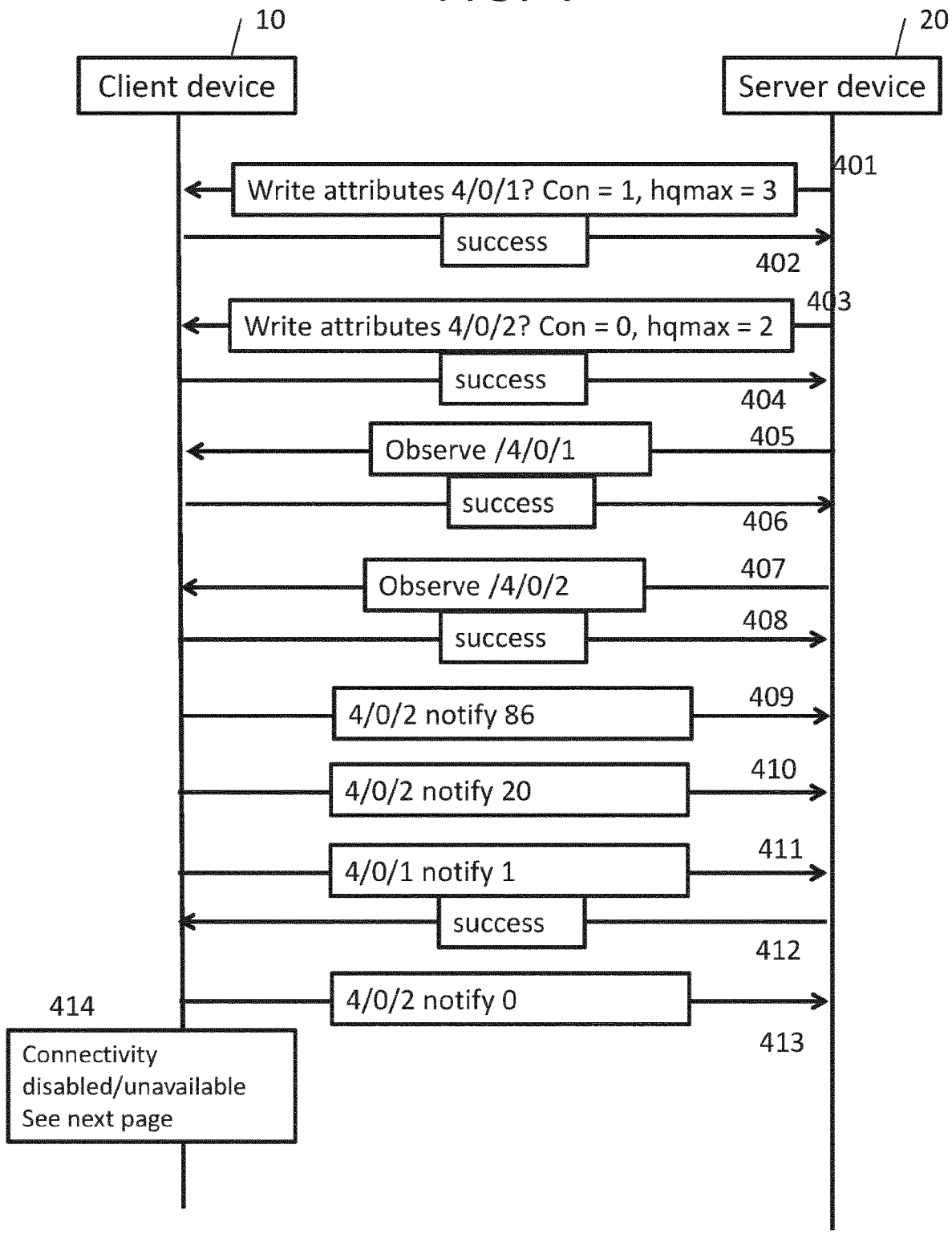

METHODS AND DEVICES FOR NOTIFICATION WITH IMPROVED RELIABILITY

CROSS-REFERENCE TO RELATED APPLICATIONS

The present application is a national stage entry of PCT/EP2021/061714 filed May 4, 2021, which claims priority to NL 2025499 filed May 4, 2020, the contents of each of which are hereby incorporated by reference.

FIELD OF INVENTION

The field of the invention relates to methods and devices for notifying, and more in particular for providing and receiving notifications with improved reliability using a messaging layer protocol.

BACKGROUND

Machine to machine (M2M) can be used to describe any technology that enables networked devices to exchange information and perform actions without the manual assistance of humans. For example, a first M2M device may be a client device and a second M2M device may be a server device. An exemplary messaging layer M2M protocol is the Lightweight Machine to Machine (LwM2M) protocol defined in Lightweight Machine to Machine Technical Specification, last approved version 1.1.1, Open Mobile Alliance, 25 Jun. 2019.

The M2M client device may be configured to detect one or more values (e.g., a light intensity measured by a light sensor, a pollution level measured by a pollutant sensor, a temperature measured by a temperature sensor, etc.) and notify the M2M server device regarding the one or more values detected by the M2M client device. The M2M server device may perform one or more actions in response to the notification.

Some M2M client devices, which are intended to notify an M2M server device regarding one or more values detected by the M2M client device for long periods of time, may have a limited power supply. Consequently, it can be difficult for such M2M client devices to effectively notify the M2M server device without also inefficiently depleting the M2M client devices' limited power supplies. To address this problem, the LwM2M protocol uses configuration parameters called Attributes. The role of these Attributes is to provide metadata which may communicate helpful information to the LwM2M Server, or, set up certain actions on the LwM2M client, for example easing data management. Examples of such Attributes are: "Minimum Period" (pmin) indicating the minimum time in seconds the LwM2M Client MUST wait between two notifications; "Maximum Period" (pmax) indicating the maximum time in seconds the LwM2M Client MAY wait between two notifications; "Greater Than" (gt) defining a threshold high value, etc. By using such Attributes the power consumption may be reduced.

Such M2M protocols are used for remote metering/telemetry and control solutions. Such solution are at a high level composed by two main components: devices in the field (client devices) that measure and collect information through built-in sensors, one or more centralised gateways or servers that manage and handle the data of multiple field devices. To transmit all the data collected in the field, these field devices typically make use of proven industry protocols, such as the LwM2M protocol. The selection of a protocol and the characteristics of its implementation are usually tailored to the particular needs of an installation and set during its initial commissioning.

SUMMARY

The object of embodiments of the invention is to provide methods and devices for notifying allowing improving the reliability of the notifying in a dynamic and on-demand manner, and in particular allowing improving the reliability of the notifying for embodiments where the notifying is done using a messaging layer protocol capable of notifying asynchronous data in a dynamic on-demand manner.

According to a first aspect there is provided a method for providing notifications by a client device to a server device. The method comprises performing, by the client device, the steps of: receiving, for at least one variable to be monitored by the client device, one or more predefined configuration parameters; setting or modifying a configuration of the client device to notify values for said at least one variable in accordance with the received one or more predefined configuration parameters; and, based on the set or modified configuration of the client device, notifying one or more values for said at least one variable to the server device. The one or more predefined configuration parameters include at least one of a confirmation notification parameter indicating at least whether notifications with a value for said at least one variable are to be confirmed, and a notification queue parameter related to the storing of one or more historical values for said at least one variable in a notification queue, and preferably indicating whether historical values for said at least one variable are to be stored in a notification queue and/or indicating a number of historical values for said at least one variable to be stored in a notification queue.

Thus, embodiments of the invention cover embodiments where only a confirmation notification parameter is included, embodiments where only a notification queue parameter is included, and embodiments where both parameters are included in the one or more predefined configuration parameters. The confirmation notification parameter allows specifying whether a client device should use confirmable or non-confirmable messages when transmitting asynchronous data. This may be linked to how critical the information being transmitted is and how probable is packet loss to occur. When setting the notification queue parameter, in case of temporary loss of connectivity, the client device holds the ability to queue data in an internal memory, here referred to as the notification queue, and to send it once connectivity with the server device is restored. Whether or not to use the notification queue parameter may also be linked to how critical the data is and/or to the memory resources available in the client device to accommodate this mechanism.

By including a confirmation notification parameter and/or a notification queue parameter, the behaviour of the transmission between the client device and the server device can be set in a dynamic way.

Embodiments of the invention are particularly advantageous for IoT use-cases which typically encompasses a multi-hardware field devices ecosystem (often with different memory capabilities). Indeed, the confirmation notification parameter and/or the notification queue parameter can be changed dynamically and on demand at any point of the life time of the client devices, such that the notifying can be made reliable where needed.

According to a preferred embodiment, the step of receiving comprises: receiving, for a first variable to be monitored by the client device, one or more predefined configuration parameters, and receiving, for a second variable to be monitored by the client device, one or more predefined configuration parameters. The one or more predefined configuration parameters for the first variable include at least one of: a confirmation notification parameter indicating at least whether notifications including a value for said first variable are to be confirmed, a notification queue parameter indicating whether historical values for said first variable are to be stored in a notification queue and/or indicating a number of historical values for said first variable to be stored in a notification queue. Similarly, the one or more configuration parameters for the second variable to be monitored by the client device, include at least one of a confirmation notification parameter indicating at least whether notifications including a value for said second variable are to be confirmed, a notification queue parameter indicating whether historical values for said second variable are to be stored in a notification queue and/or indicating a number of historical values for said second variable to be stored in a notification queue. In that way, the one or more predefined configuration parameters may be set independently for the first and the second variable. In such an embodiment, the step of setting or modifying a configuration of the client device may comprise setting or modifying a first and second configuration to notify values for said first and second variable in accordance with the received one or more predefined configuration parameters for said first and second variable, respectively; and the step of notifying may comprise notifying one or more values for said first variable based on the first configuration and notifying one or more values for said second variable based on the second configuration.

In this manner a client device may be configured dynamically for each variable depending on the type of data being transmitted. For example, for data from a first sensor which is critical, the notifying may use confirmable messages and queuing of historical data, whilst for data of a second sensor of the client device which is less critical, the notifying may use non-confirmable messages and no queuing of historical data.

The skilled person understands that also more than two variables may be set independently in this manner. For example, a client device with three different sensors for measuring three different variables may be set using three different sets of one or more configurations parameters. Also, other embodiments of the invention may allow setting two or more variables with the same one or more predefined configuration parameters. For example, a client device with two sensors sensing data which is critical for both sensors may be set in the same way using only one set of configuration parameters.

According to an exemplary embodiment, the step of notifying comprises: sending a first value for the at least one variable; and when the confirmation notification parameter indicates that notifications are to be confirmed, and no confirmation is received, sending again the first value of the at least one variable. Optionally, the first value may be re-sent a number of times as long as no confirmation is received. In an exemplary embodiment, the characteristics of the re-sending of a notification as long as no confirmation is received may be defined in an application layer protocol implemented below the messaging layer protocol defining the one or more configuration parameters. For example, the messaging layer protocol LwM2M may be implemented on top of a Constrained Application Protocol (CoAP), and the Constrained Application Protocol may define a re-transmission mechanism with a maximum predetermined number of retransmissions. In an alternative embodiment, the one or more configuration parameters may include not only a confirmation notification parameter indicating at least whether notifications with a value for said at least one variable are to be confirmed, but also other parameters related to one or more actions to perform when a confirmable notification is not confirmed, such as a maximum number of times that a notification needs to be retransmitted in the event that no confirmation is received, a time between retransmissions, etc.

According to an exemplary embodiment, the step of notifying comprises, when the notification queue parameter indicates that historical values for the at least one variable are to be stored: when the client device is in a non-transmission mode, storing historical values for said variable in a notification queue; and when the client device is re-entering a transmission mode, notifying one or more historical values stored in the notification queue to the server device. Preferably, the one or more historical values stored in the notification queue are notified in a single notification message, but it is also possible to send a number of consecutive notification messages.

Preferably, the notification queue parameter is a parameter indicating a number of historical values for the at least one variable to be stored in a notification queue. In a possible implementation, this parameter is an integer value with a predetermined maximum value, wherein a value of 0 indicates that no queuing has to be done; a value of 1 indicates that one historical value needs to be stored; etc. In another embodiment the notification queue parameter merely indicates whether historical values for said at least one variable are to be stored in a notification queue. In such an embodiment, the notification queue parameter may be a Boolean value, and the size of the queue may be fixed. In yet another embodiment, queuing may be always implemented and the notification queue parameter indicates a size of the queue having a value which is larger than or equal to a predetermined minimal value, e.g. 1. In yet another embodiment, queuing with a fixed queue size may be implemented without a notification queue parameter, and only a confirmation notification parameter may be used.

According to an exemplary embodiment, the historical values for the at least one variable are stored in the notification queue in accordance with a predefined scheme, e.g. a prioritizing scheme. For example, the scheme may be such that a value is only stored in the notification queue when it fulfils predetermined conditions. In a possible embodiment, the one or more predefined configuration parameters may include one or more queuing condition parameters specifying under which condition(s) a value for the variable has to be stored in the notification queue. Those one or more queuing condition parameters may be the same as those used for determining whether a value for the variable needs to be notified, see further.

According to an exemplary embodiment, the notification queue parameter is a parameter indicating a number of historical values for the at least one variable to be stored in a notification queue, and once this number is reached and connectivity is not restored, performing any one of the following actions or a combination thereof:
  discarding subsequent values for the at least one variable;
  applying a moving window mechanism, in which the oldest values stored in the notification queue are discarded to make room for storing subsequent values;

compounding values stored in the notification queue, e.g. by discarding consecutive values with the same content, to make room for storing subsequent values for the at least one variable.

In that manner the usage of the notification queue, and thus the memory usage, can be improved.

According to an exemplary embodiment where at least a first variable and a second variable are being monitored, the one or more predefined notification parameters may further comprise at least one priority parameter defining a level of priority for said first and second variable respectively. The method may then comprise a step of storing or discarding values for said first and/or second variable in a notification queue taking into account said at least one priority parameter. Either a notification queue with a fixed size may be used or a notification queue with a notification queue parameter indicating a number of historical values for the first and second variable respectively to be stored in the notification queue. Once the queue is full and connectivity is not restored, the priority level may be taken into account for deciding which stored values for the first and/or second variable to keep or discard.

In that manner memory usage within M2M constrained devices may be improved. Indeed, such a mechanism provides a dynamic buffering based on priority levels. The use of such priority parameter, would for example allow and operator to set a criteria in the device to drop from the memory buffer a value for a first variable related with "battery level" in detriment of a value for a more important second variable like "fire detection".

In another possible embodiment, the one or more predefined notification parameters may further comprise at least one priority notification parameter defining a level of priority related to the notifying of values for said first and second variable respectively. The method may then comprise a step of notifying values for said first and/or second variable taking into account said at least one priority notification parameter.

According to an exemplary embodiment, the notifying includes sending a notification including one or more historical values stored in the notification queue as well as one or more time indications for the one or more historical values. The one or more time indications are representative for the time of monitoring of the one or more values. These time indications may comprise absolute values and/or offset values.

According to an exemplary embodiment, the one or more predefined configuration parameters further comprise one or more condition parameters that indicate one or more conditions that, if satisfied, trigger the client device to notify the server device. Optionally, a value for the variable is stored in the notification queue when the one or more conditions indicated by the one or more condition parameters are satisfied. In other words, optionally the same condition parameters may be used for determining whether a value needs to be notified and for determining whether a value needs to be stored, e.g. when the connectivity is disabled.

According to a preferred embodiment, the one or more predefined configuration parameters further comprise one or more of the following: a minimum notification period parameter indicating a minimum time between two notifications by the client device, a maximum notification period parameter indicating a maximum time between two notifications by the client device, an upper threshold parameter indicating that the client device must send a notification when a value for the variable is above a threshold, a lower threshold parameter indicating that the client device must send a notification when a value for the variable is below a threshold, a step parameter indicating that the client device must send a notification when a variation of a value of the variable since the last notification is above a minimum change, a minimum evaluation period parameter indicating a minimum time between two evaluations of a notifying criterion by the client device, a maximum evaluation period parameter indicating a maximum time between two evaluations of a notifying criterion by the client device. Such parameters may correspond for example to the following attributes defined in LwM2M Minimum Period (pmin), Maximum Period (pmax), Greater Than (gt), Less Than (lt), Step (st), Minimum Evaluation Period (epmin), Maximum Evaluation Period (epmax).

Optionally, a value for the variable is stored in the notification queue when one or more conditions indicated by at least one of the upper threshold parameter, the lower threshold parameter, the step parameter, the minimum evaluation period parameter and the maximum evaluation period parameter, is satisfied.

Embodiments of the invention may also be implemented in protocols different from LwM2M used for similar applications, and in particular for IoT applications. For example, a protocol used in a Wireless smart utility network (Wi-SUN) could also benefit from embodiments of the invention. In an exemplary embodiment, an embodiment of the method may be used in a messaging protocol for the Internet of Things (IoT).

According to a further aspect, there is provided a method for obtaining notifications by a server device from one or more client devices, the method comprising performing, by the server device, the steps of: sending to a client device, for at least one variable to be monitored by said client device, one or more predefined configuration parameters; and receiving, from the client device, notifications with one or more values for said at least one variable. The one or more predefined configuration parameters include at least one of: a confirmation notification parameter indicating at least whether notifications with a value for said at least one variable are to be confirmed, a notification queue parameter related to the storing of one or more historical values for said at least one variable in a notification queue, and preferably indicating whether historical values for said at least one variable are to be stored by said client device and/or indicating a number of historical values for said at least one variable to be stored in a notification queue.

In a preferred embodiment, the step of sending to a client device comprises sending, for a first variable to be monitored by the client device, one or more predefined configuration parameters, and sending, for a second variable to be monitored by the client device, one or more predefined configuration parameters, such that the one or more predefined configuration parameters may be set independently for the first and the second variable. The one or more predefined configuration parameters for the first variable may include a confirmation notification parameter indicating at least whether notifications including a value for said first variable are to be confirmed, and/or a notification queue parameter indicating whether historical values for said first variable are to be stored and/or indicating a number of historical values for said first variable to be stored in a notification queue. The one or more predefined configuration parameters for the second variable may include a confirmation notification parameter indicating at least whether notifications including a value for said second variable are to be confirmed, and/or a notification queue parameter indicating whether historical values for said second variable are to be stored and/or indicating a number of historical values for said second variable to be stored in a notification queue. Preferably, the step of receiving notifications comprises receiving notifications with one or more values for said first variable in accordance with the one or more defined configuration parameters sent for the first variable, and receiving notifications with one or more values for said second variable in accordance with the one or more defined configuration parameters sent for the second variable.

According to a preferred embodiment, the method further comprises, when the confirmation notification parameter indicates that notifications are to be confirmed, sending a confirmation message to the client device.

According to a preferred embodiment, the one or more predefined configuration parameters further comprise one or more condition parameters that indicate one or more conditions that, if satisfied, trigger the client device to notify the server device. Optionally, the same one or more condition parameters may be used to trigger the client device to store values in the notification queue, e.g. when no connectivity is available. Alternatively, the one or more predefined configuration parameters further comprise one or more separate queueing condition parameters that indicate one or more conditions that, if satisfied, trigger the client device to queue a value in the notification queue.

According to a preferred embodiment, the confirmation notification parameter comprises a flag which indicates whether notifications are to be confirmed. This flag may be a Boolean value or an Integer value.

According to a further aspect there is provided a client device configured for providing notifications to a server device. The client device is configured for monitoring at least one variable, and is further configured for: receiving, for at least one variable, one or more predefined configuration parameters including a confirmation notification parameter related to the storing of one or more historical values for said at least one variable in a notification queue, and preferably indicating at least whether notifications with a value for said at least one variable are to be confirmed and/or a notification queue parameter indicating whether historical values for said at least one variable are to be stored in a notification queue and/or indicating a number of historical values for said at least one variable to be stored in a notification queue; setting or modifying a configuration of the client device to notify values for said at least one variable in accordance with the received one or more predefined configuration parameters; and based on the set or modified configuration of the client device, notifying one or more values for said at least one variable to the server device.

According to a further aspect, there is provided a server device for obtaining notifications from one or more client devices, said server device being configured for: sending to a client device, for at least one variable to be monitored by said client device, one or more predefined configuration parameters including a confirmation notification parameter indicating at least whether notifications with a value for said at least one variable are to be confirmed, and/or a notification queue parameter related to the storing of one or more historical values for said at least one variable in a notification queue, and preferably indicating whether historical values for said at least one variable are to be stored by said client device and/or indicating a number of historical values for said at least one variable to be stored in a notification queue; receiving, from the client device, notifications with one or more values for said at least one variable.

Preferred features for the client device and the server device are disclosed in the claims and correspond with the preferred features of the various embodiments of the methods disclosed above.

According to a further aspect, there is provided a luminaire comprising a client device of any one of the previous embodiments. According to yet another aspect, there is provided a luminaire system comprising a plurality of such luminaires and a server device according to any one of the embodiments disclosed above.

According to a further aspect of the invention, there is provided a computer program comprising computer-executable instructions to perform a method, when the program is run on a computer, according to any one of the steps of any one of the embodiments disclosed above.

According to a further aspect of the invention, there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 2 is a flow chart illustrating exemplary embodiments of methods for sending and receiving notifications, for a client device which monitors two variables;

DESCRIPTION OF EMBODIMENTS

Figure 1:
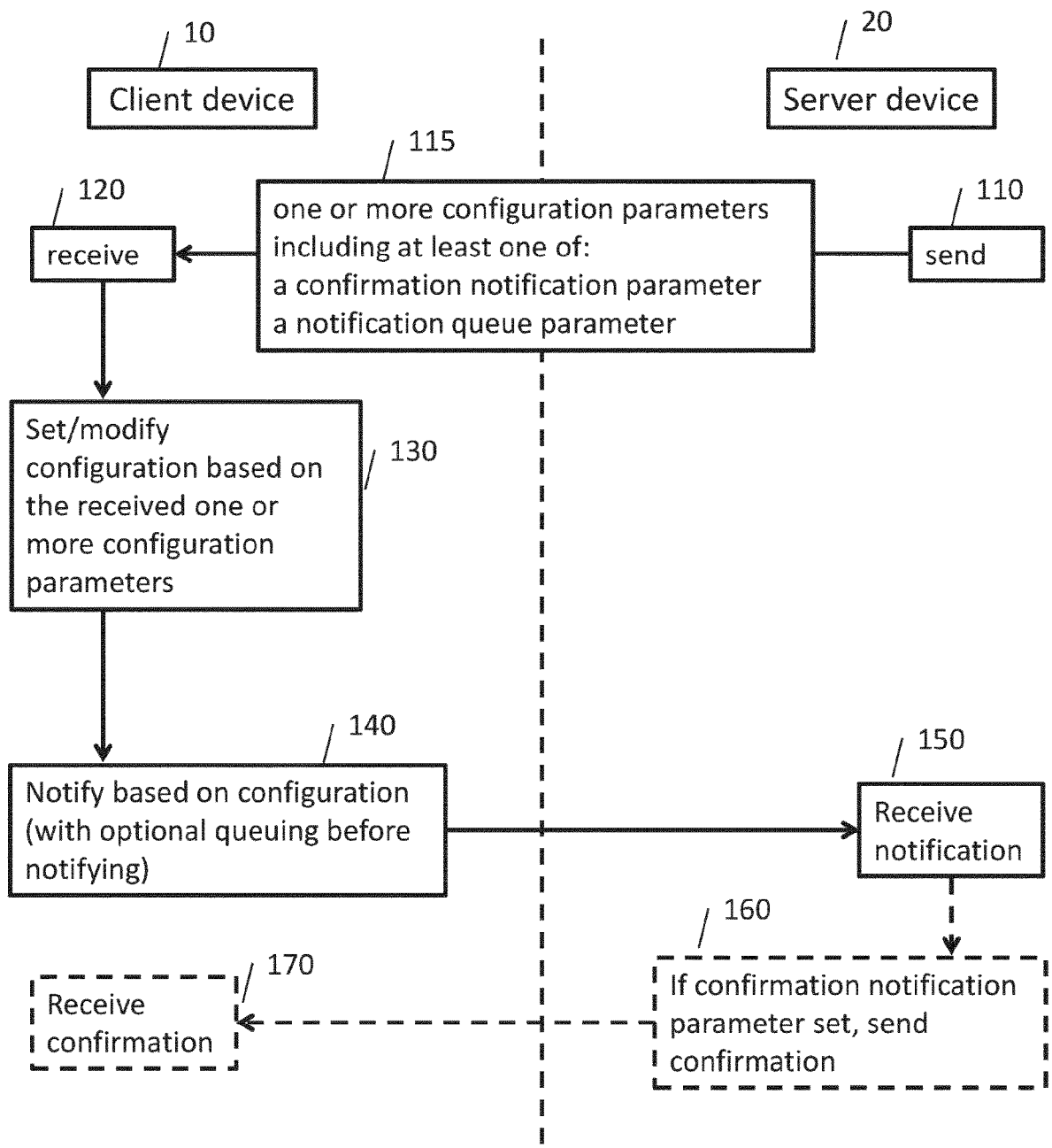
FIG. 1 is a flow chart illustrating exemplary embodiments of methods for sending and receiving notifications.

FIG. 1 illustrates a first embodiment for sending notifications from a client device 10 to a server device 20. In some embodiments, the client device 10 and the server device 20 may be M2M devices, for example, LwM2M Devices as discussed in Lightweight Machine to Machine Technical Specification, last approved version 1.1.1, Open Mobile Alliance, Jun. 25, 2019, the disclosure of which is incorporated by reference herein in its entirety. In some embodiments, the client device 10 and the server device 20 may be physically separate and distinct devices. In some embodiments, a single computing device may comprise both the client device 10 and the server device 20.

In some embodiments, the communication system that includes the client device 10 and the server device 20 may comprise a wireless communication system. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system or a New Radio (NR) system. A wireless multiple-access communication system may include a number of base stations or access network nodes, each simultaneously supporting communication for multiple communication devices, which may be otherwise known as user equipment (UE). In some embodiments, the client device 10 may be a user equipment, the server device 20 may be a user equipment, or both the client device 10 and the server device 20 may be a user equipment.

The client device 10 and the server device 20 may communicate using one or more wireless communication systems (such as, CDMA systems, TDMA systems, OFDMA systems, LTE systems, NR systems, WiFi systems, Bluetooth systems, or any wireless communication systems), one or more wired communication systems, or any combination thereof. Thus, in some embodiments, the client device 10 and the server device 20 may communicate using one or more wireless links, one or more wired links, or any combination thereof.

The client device 10 may be configured to monitor one or more variables, for example, one or more measured variables (e.g., a light intensity measured by a light sensor, a temperature measured by a temperature sensor, a pressure measured by a pressure sensor, a power consumption measurement, a quality-of-service measurement such as downlink bandwidth performance or radio signal strength, a pollution related measurement, a virus related measurement, or any other suitable measurements).

The client device 10 may comprises one or more sensors. The sensor may be a sensor sensing environmental data. Examples of sensors which may be included are a movement sensor, a light sensor, an image sensor, a radar sensor, a sound sensor, a voice recorder, a pollutant sensor, a microphone, a detector of CO2, NOx, smoke, etc. The client device 10 may be part of a luminaire.

FIG. 1 illustrates a series of communications exchanged between the client device 10 and the server device 20. In a first step 110, the server device sends to the client device 10, for a variable to be monitored by the client device 10, one or more predefined configuration parameters 115. In a second step 120 the one or more predefined configuration parameters 115 are received at the client device 10. The one or more predefined configuration parameters 115 include at least one of: a confirmation notification parameter indicating at least whether notifications with a value for the variable are to be confirmed, a notification queue parameter related to the storing of one or more historical values for said variable in a notification queue, and preferably indicating whether historical values for said variable are to be stored by the client device 10 and/or indicating a number of historical values for the variable to be stored in a notification queue. In a third step 130, a configuration of the client device 10 to notify values for the variable in accordance with the received one or more predefined configuration parameters is set or modified. Such modification may take place at any time after having installed in the client device 10. In a fourth step 140, the client device 10 notifies one or more values for the variable to the server device 20, based on the set or modified configuration of the client device 10. When the notification queue parameter is set, in case of temporary loss of connectivity, in the fourth step 140, instead of notifying which is temporarily not possible, one or more values are stored in a notification queue. In a fifth step 150, the server device 20 receives from the client device 10, a notification with a value for the variable. In a sixth step 160, when the confirmation notification parameter indicates that notifications are to be confirmed, a confirmation is sent by the server device 20 to the client device 10, and in a seventh step 170, the confirmation is received. If the confirmation notification parameter indicates that notifications are to be confirmed and no confirmation is received, the client device 10 sends again the value of the variable (not shown in FIG. 1).

It is noted that the one or more configuration parameters may include only a confirmation notification parameter or only a notification queue parameter or both parameters. The confirmation notification parameter allows the server device 20 to specify whether a client device should use confirmable or non-confirmable messages when transmitting asynchronous data, e.g. depending on how critical the information included in the notifications is and/or on the quality of the connection. When setting the notification queue parameter, in case of temporary loss of connectivity, the client device 10 holds the ability to buffer data in an internal memory and to send it once connectivity with the server device is restored. Whether or not to use the notification queue parameter may also be linked to how critical the data is and/or to the memory resources available in the client device to accommodate this mechanism.

In step 140, when the notification queue parameter indicates that historical values for the variable are to be stored and when the client device 10 is in a non-transmission mode, the client device 10 stores one or more historical values for said variable in a notification queue; and when the client device is re-entering a transmission mode, the server device 20 is notified with the one or more historical values stored in the notification queue. Entering in a non-transmission mode may be caused by a lack of connectivity, the receipt of a message (e.g. from an IoT server) telling the client device to switch into a non-transmission mode, energy saving requirements, etc. Preferably, the one or more historical values stored in the notification queue are notified in a single notification message, but it is also possible to send a number of consecutive notification messages. Preferably, the one or more historical values are notified together with time indications for the one or more historical values. The one or more historical values for the variable may be stored in the notification queue in accordance with a predefined scheme. For example, the scheme may be such that a value is only stored in the notification queue when it fulfils predetermined conditions. In a possible embodiment, the one or more predefined configuration parameters 115 may include one or more queuing condition parameters specifying under which condition(s) a value for the variable has to be stored in the notification queue. Those one or more queuing condition parameters may also be the same as one or more condition parameters used for determining whether a value for the variable needs to be notified.

In a preferred embodiment, the one or more predefined configuration parameters 115 further comprise one or more condition parameters that indicate one or more conditions that, if satisfied, trigger the client device to notify the server device (step 140). When the one or more conditions indicated by the one or more condition parameters are satisfied and the connectivity of the client device is not available, a value for the variable is stored in the notification queue. In other words, optionally the same condition parameters may be used for determining whether a value needs to be notified and for determining whether a value needs to be stored.

FIG. 2 illustrates another exemplary embodiment where a client device 10 monitors two or more variables including a first variable and a second variable. In step 111 one or more predefined configuration parameters 115 are sent by the server device 20 for the first variable to be monitored by the client device 10, and in step 112 one or more predefined configuration parameters 116 are sent by the server device 20 for the second variable to be monitored by the client device 10. In steps 121 and 122 the one or more predefined configuration parameters 115 and 116 are received at the client device 10, for the first and second variable, respectively. The one or more predefined configuration parameters 115, 116 for the first and second variable each include at least one of: a confirmation notification parameter indicating at least whether notifications including a value for said first/second variable are to be confirmed, a notification queue parameter related to the storing of one or more historical values for said first/second variable in a notification queue, and preferably indicating whether historical values for said first/second variable are to be stored in a notification queue and/or indicating a number of historical values for said first/second variable to be stored in a notification queue. Thus, the one or more predefined configuration parameters 115, 116 may be set independently for the first and the second variable. In steps 131 and 132, a first and second configuration to notify values for the first and second variable in accordance with the received one or more predefined configuration parameters for said first and second variable, respectively, is set or modified. In steps 141 and 142 one or more values for the first variable are notified based on the first configuration and one or more values for the second variable are notified based on the second configuration, respectively. When the notification queue parameter is set for the first and/or second variable, in case of temporary loss of connectivity, in the step 141, 142, instead of notifying, one or more values for the first and/or second variable are stored in a notification queue. In steps 151, 152, the server device 20 receives from the client device 10, a notification with a value for the first and second variable, respectively. In steps 161, 162, when the confirmation notification parameter for the first and/or second variable indicates that notifications are to be confirmed, a confirmation is sent by the server device 20 to the client device 10 for the first and/or second variable. In steps 171, 172, the confirmation for the first and/or second variable is received. The confirmation message sent in steps 171, 172 may include an identification of the notification message received in steps 151, 152, respectively. If the confirmation notification parameter indicates that notifications are to be confirmed for the first and/or second variable, and no confirmation is received for the first and/or second variable, the client device 10 sends again the value of the first and/or second variable (not shown in FIG. 2).

It is noted that, instead of setting independent configurations parameters for each variable, it is also possible to set a single set of configuration parameters for multiple variables. Further, it is noted that more complex queueing mechanisms also fall within the scope of the invention. For example, multiple queues may be provided per variable or multiple variables may share a single queue, or a value for a variable having a full queue may be stored in the queue of another variable provided predefined conditions are fulfilled, etc. More generally the notification queue parameter may be any parameter related to a queue for storing one or more historical values of notifications and more than one notification queue parameter may be used to define more complex queueing mechanisms.

Thus, a client device may be configured dynamically for each variable depending on the type of data being transmitted. For example, for data from a first sensor of the client device 10, which is critical, the notifying may use confirmable messages and queuing of historical data, whilst for data of a second sensor of the client device 10, which is less critical, the notifying may use non-confirmable messages and no queuing of historical data. Also more than two variables may be set independently in this manner. For example, a client device with three different sensors for measuring three different variables may be set using three different sets of one or more configurations parameters. Also, other embodiments of the invention may allow setting two or more variables with the same one or more predefined configuration parameters. For example, a client device with two sensors sensing critical data may be set using only one set of configuration parameters.

In other words, in accordance with exemplary embodiments, there are provided two main operations to dynamically and on-demand manage the characteristics of client-to-server communications:

1) a confirmation notification parameter which is signalled to the client device and associated to a specific variable, i.e. to a specific type of data, telling the client device that it should use either confirmable or non-confirmable messages when notifying the server device on that particular type of data. Thus, the client device is provided with the ability to use confirmable messaging on data considered more critical, non-confirmable messages on data deemed not critical and the ability to the server device to change this behaviour at any point in the lifetime of the installation.

2) a notification queue parameter which is signalled to the client device and associated to a specific variable, i.e. to a specific type of data, telling the client device if in the event of loss of connectivity with the server, it should buffer it in memory, i.e. in the notification queue. Preferably the notification queue parameter indicates how many entries it should store in the notification queue. This allows the setting of different criteria for queuing of historical values for a specific variable depending on the type of data being transmitted and the ability for the server to change the queuing criteria on demand at any point in the lifetime of the client-server installation.

Figure 3:
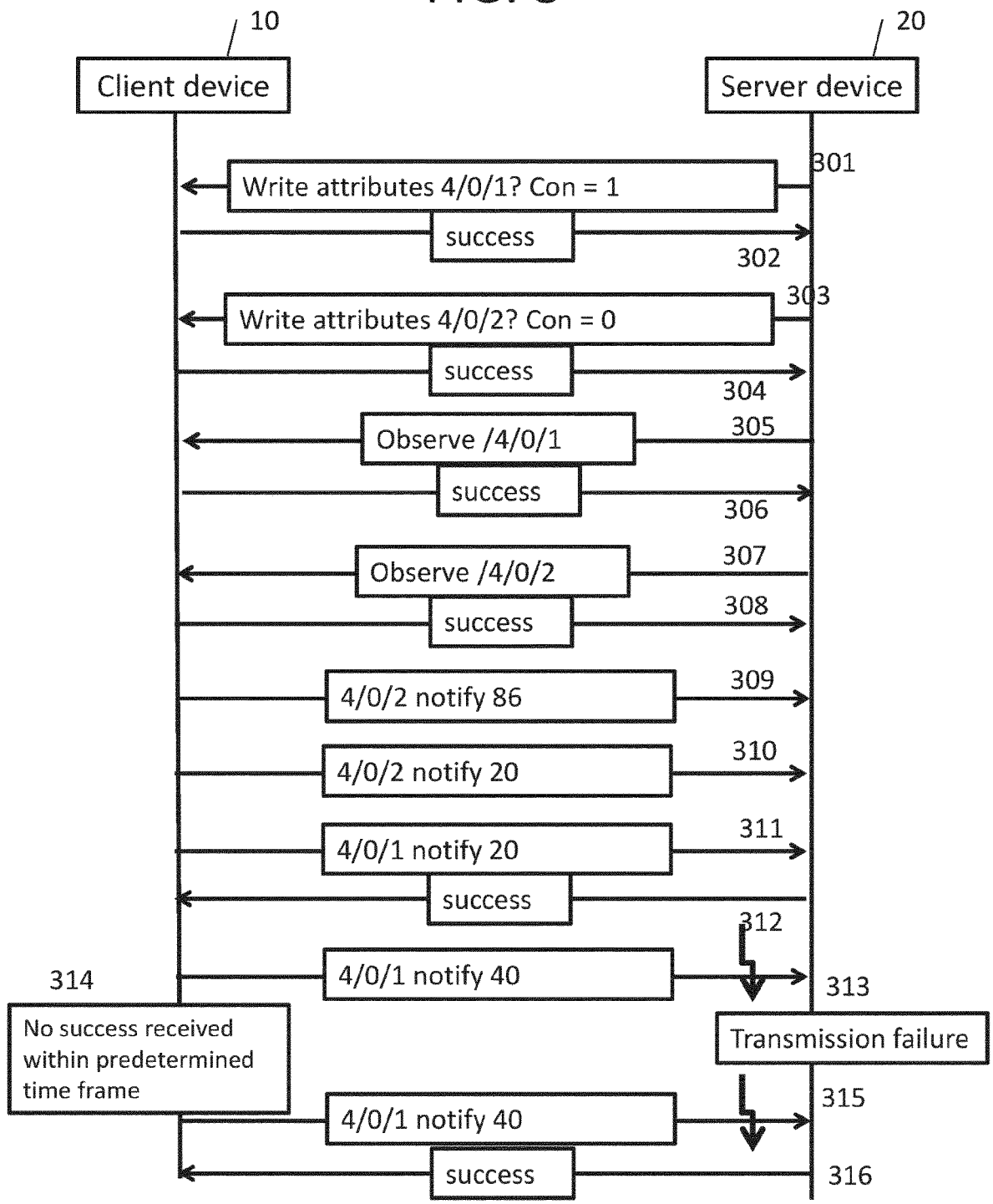
FIG. 3 is a flow chart illustrating exemplary embodiments of methods for sending and receiving notifications, using LwM2M modified in accordance with an exemplary embodiment of the invention where only a confirmation notification parameter is used.
Figure 4:
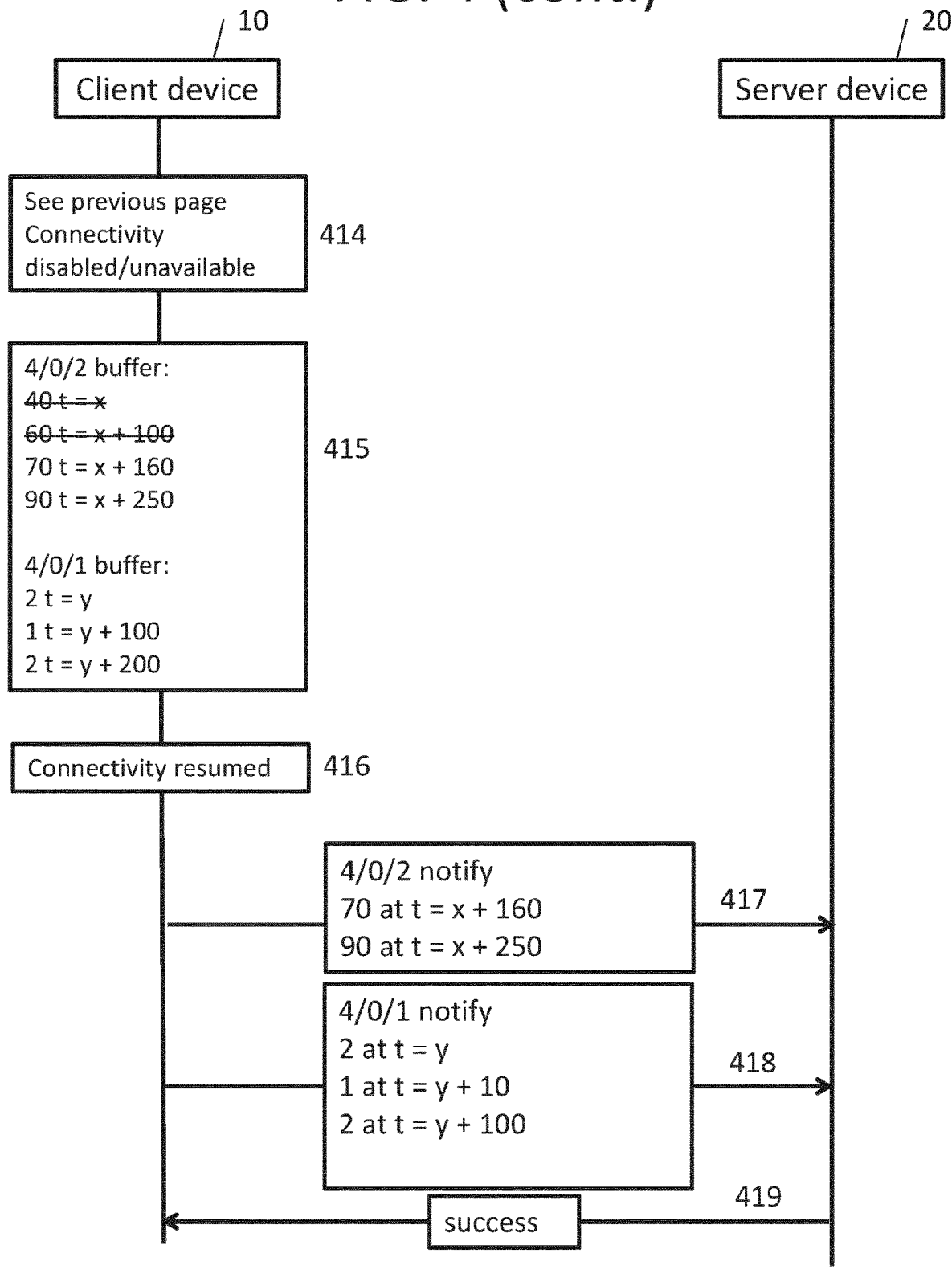
FIG. 4 is a flow chart illustrating exemplary embodiments of methods for sending and receiving notifications, using LwM2M modified in accordance with an exemplary embodiment of the invention where a confirmation notification parameter as well as a notification queue parameter is used.

Furthermore, exemplary embodiments of the invention define a clear and convenient framework to implement the concepts described previously by building on top of the established industry standards of CoAP (RFC 7252) and LwM2M (defined in Lightweight Machine to Machine Technical Specification, last approved version 1.1.1, Open Mobile Alliance, 25 Jun. 2019), extending the messaging frameworks provided under the specification of both protocols to include the confirmation notification parameter and/or the notification queue parameter as Attributes with associated actions. Now an example of such an extended messaging framework will be illustrated with reference to FIGS. 3 and 4. FIG. 3 illustrates an example where the confirmation notification parameter is added as an Attribute and FIG. 4 illustrates an example where both the confirmation notification parameter and the notification queue parameter are added as attributes.

In LwM2M, attributes are metadata which can be attached to an Object, an Object Instance, or a Resource. The value of an Attribute is LwM2M Server specific. These attributes can fulfil various roles, from carrying information only (e.g. Discover) to carrying parameters for setting up certain actions on the LwM2M Client (e.g. Notifications). Attributes attached to Objects, Object Instances, Resources are respectively named O-Attribute, OI-Attribute, R-Attribute. These Attributes may be carried in the message payload of Registration and Discover operations; they also may be updated—when writable—through the "Write-Attributes" operation. Further, LwM2M defines a "Device Management and Service Enablement" interface. For this interface, one of the downlink operations is "Write-Attributes". The "Write-Attributes" operation is used to change attribute values. Also, LwM2M defines an "Information Reporting Interface" which is used by a LwM2M Server to observe any changes in a Resource on a registered LwM2M Client, receiving notifications when new values are available. This observation relationship is initiated by sending an "Observe" or "Observe-Composite" operation to the L2M2M Client for an Object, an Object Instance or a Resource. An observation ends when a "Cancel Observation" or "Cancel Observation-Composite" operation is performed.

In the present version of LwM2M, the LwM2M Server and the LwM2M Client support the following Class Attributes:

The Attribute called "Confirmable Notification" (con) corresponds with the confirmation notification parameter discussed above. The Notification Confirmable Attribute indicates whether a Notification resulting from an Observation of a specific Object, Object Instance, Resource, Resource Instance MUST be sent over confirmable transport. If a Notification includes several Objects or Object Instances or Resources or Resource Instances or a combination thereof, then this Notification MUST be sent over confirmable transport if at least one of the Notification components has con=1.

The Attribute called "Maximum historical queue" (hqmax) corresponds with the notification queue parameter discussed above. The Maximum historical queue Attribute indicates whether the data resulting from an Observation of a specific Object, Object Instance, Resource, Resource Instance SHOULD be stored and up to how many entries MAY be buffered before the device starts discarding notification events, i.e. historical data is collected while the LwM2M Client is offline, or, the LwM2M Server account is disabled. If this attribute is present, only the data of Objects, Object Instances, Resources, Resource Instances with

| Attribute Name | CoRE Link param | Attachment | Assignation Level | Required | Access Mode | Value Type | Default Value | Apply Condition |
|---|---|---|---|---|---|---|---|---|
| Minimum Period | "pmin" "=" 1*DIGIT | Resource | Resource Resource Instance Object Object Instance | No | RW | Integer | 0 (sec) | Readable Resource |
| Maximum Period | "pmax" "=" 1*DIGIT | Resource | Resource Resource Instance Object Object Instance | No | RW | Integer | — | Readable Resource |
| Greater Than | "gt" "=" 1*DIGIT ["." 1*DIGIT] | Resource | Resource Resource Instance | No | RW | Float | — | Numerical & Readable Resource |
| Less Than | "lt" "=" 1*DIGIT ["." 1*DIGIT] | Resource | Resource Resource Instance | No | RW | Float | — | Numerical & Readable Resource |
| Step | "st" "=" 1*DIGIT ["." 1*DIGIT] | Resource | Resource Resource Instance | No | RW | Float | — | Numerical & Readable Resource |
| Minimum Evaluation Period | "epmin" "=" 1*DIGIT | Resource | Resource Resource Instance Object Object Instance | No | RW | Integer | — | Readable Resource |
| Maximum Evaluation Period | "epmax" "=" 1*DIGIT | Resource | Resource Resource Instance Object Object Instance | No | RW | Integer | — | Readable Resource |

In exemplary embodiment of the invention, this list of attributes may be extended with one or both of the following attributes:

hqmax>0 will be allowed to store entries in the outbound notification queue. "hqmax" defines the maximum number of entries associated with an Object, Object Instance,

| Attribute Name | CoRE Link param | Attachment | Assignation Level | Required | Access Mode | Value Type | Default Value | Apply Condition |
|---|---|---|---|---|---|---|---|---|
| Confirmable Notification | "con" | Resource | Resource Resource Instance Object Object Instance | No | RW | Boolean or Integer | 0 | Readable Resource |
| Maximum historical queue | "hqmax" | Resource | Resource Resource Instance Object Object Instance | No | RW | Integer | 0 | Readable Resource |

Resource, Resource Instance(s) that MAY be stored in outbound notification queues, once the number of entries reaches "hqmax" the LwM2M client must selectively discard events so that the total queue size for that Object, Object Instance, Resource, Resource Instance(s) does not exceed "hqmax". When discarding buffered notification elements, the LwM2M client may prioritize entries that report on a change of a value for a given Resource rather than two consecutive entries reporting the same value, but also other schemes may used to determine which values to discard.

It is noted that e.g. the Attribute Name may change during the standardisation process. Further, in another embodiment, instead of adding the attributes to the table above (NOTIFICATION class attributes), the attributes could be added to the PROPERTIES class attributes, or, to a new class being created.

An Attribute may be written for an Object, an Object Instance, a Resource or Resource Instance. Thus, an Attribute may be written for one variable (e.g. a single Resource instance) or for multiple variables (e.g. multiple Resource instances of an Object). It is noted that Objects may be defined in various way. For example, a luminaire could be considered to be a device corresponding the Object, or a device of a luminaire, e.g. a camera or a sensor or a controller, could be considered to the device corresponding to the Object. Also, a multiple instance Object is possible, and the Resources can be defined in various ways and can be either single or multi-instance Resources.

FIG. 3 illustrates a first exemplary embodiment where the Attribute called "Confirmable Notification" (con) corresponding with the confirmation notification parameter is added. In a first step 301 the attribute "con=1" is written for Resource 4/0/1, and in a second step 302 this is confirmed with a success message sent from the client device 10 to the server device 20. In a third step 303 the attribute "con=0" is written for Resource 4/0/2, and in a fourth step 304 this is confirmed with a success message sent from the client device 10 to the server device 20. In step 305 the service device 20 requests to observe Resource 4/0/1, and in a following step 306 this is confirmed with a success message sent from the client device 10 to the server device 20. In step 307 the service device 20 requests to observe Resource 4/0/2, and in a following step 308 this is confirmed with a success message sent from the client device 10 to the server device 20. In step 309 and 310 consecutive values of 86 and 20 for Resource 4/0/2 are notified from the client device 10 to the server device 20. Those notifications are not confirmed by the server device 20 as con=0 for Resource 4/0/2. In step 311 a value of 20 for Resource 4/0/1 is notified by the client device 10 to the server device 20. This notification is confirmed by the server device 20 in step 312 as con=1 for Resource 4/0/1. The success message sent in step 312 may include the CoAP message ID of the notification message sent in step 311. In step 313 a value of 40 for Resource 4/0/1 is notified by the client device 10 to the server device 20. This notification should be confirmed by the server device 20 as con=1 for Resource 4/0/1, but in the illustrated example, it is assumed that there is a transmission failure, and because of the transmission failure the notification is not received by the server device 20. The client device 10 detects in step 314 that it has not received a confirmation, and retransmits the notification with value 40 in step 315.

In the illustrated example, it is assumed that the second transmission is successful and that the server device 20 transmits a success message in step 316. However, in other examples, the notification may have to be retransmitted multiple times before receiving a success message, and in a worst case scenario of longer connectivity problem, some notifications may not be received at all. However, it will be understood that the reliability of the notifying is increased for variables for which con=1. In an exemplary embodiment, the characteristics of the re-sending of a notification as long as no confirmation is received may be defined in an application layer protocol implemented below LwM2M. For example, the messaging layer protocol LwM2M may be implemented on top of a Constrained Application Protocol (CoAP), and the Constrained Application Protocol may define a re-transmission mechanism with a maximum predetermined number of retransmissions.

In the example of FIG. 3, the attribute "con=0" or "con=1" is written for each Resource 4/0/1 or 4/0/2 independently, but it is also possible to write an attribute "con=0" or "con=1" for an Object Instance 4/0 which will cause all Resources of that Object Instance to be set to "con=0" or "con=1", or for an Object 4 which will cause all Resources of all Object Instances of the Object to be set to "con=0" or "con=1". For example, a message "Write attributes 4/0? Con=1" will set con=1 for Resource 4/0/1, for Resource 4/0/2 and for any other Resource of the Object Instance 4/0.

FIG. 4 illustrates a second exemplary embodiment where the Attribute called "Confirmable Notification" (con) corresponding with the confirmation notification parameter and the Attribute "Maximum historical queue" (hqmax) corresponding with the notification queue parameter are added. In a first step 401 the attributes "con=1" and "hqmax=3" are written for Resource 4/0/1, and in a second step 402 this is confirmed with a success message sent from the client device 10 to the server device 20. In a third step 403 the attributes "con=0" and "hqmax=2" are written for Resource 4/0/2, and in a fourth step 404 this is confirmed with a success message sent from the client device 10 to the server device 20. It is noted that the values set for hqmax are rather low in this example, and that in practice much higher values may be set. In step 405 the service device 20 requests to observe Resource 4/0/1, and in a following step 406 this is confirmed with a success message sent from the client device 10 to the server device 20. In step 407 the service device 20 requests to observe Resource 4/0/2, and in a following step 408 this is confirmed with a success message sent from the client device 10 to the server device 20. In step 409 and 410 consecutive values of 86 and 20 for Resource 4/0/2 are notified from the client device 10 to the server device 20. Those notifications are not confirmed by the server device 20 as con=0 for Resource 4/0/2. In step 411 a value of 1 for Resource 4/0/1 is notified by the client device 10 to the server device 20. This notification is confirmed by the server device 20 in step 412 as con=1 for Resource 4/0/1. In step 413 a value of 0 for Resource 4/0/1 is notified by the client device 10 to the server device 20. This notification should be confirmed by the server device 20 as con=1 for Resource 4/0/1, but in the illustrated example, it is assumed that the connectivity id disabled or unavailable, see step 414. In step 415 the client device 10 starts storing historical values in the notification queue. It the example it is assumed that the following values are stored:

For Resource 4/0/2:
A value of 40 at time t=x
A value of 60 at time t=x+100
A value of 70 at time t=x+160
A value of 90 at time t=x+250

As hqmax=2 for Resource 4/0/2, only two values will be stored. For example, only the two most recent values may be stored as indicated in FIG. 4. However, also other schemes may be used to determine which values to discard in the notification queue.

For Resource 4/0/1:
A value of 2 at time t=y
A value of 1 at time t=y+100
A value of 2 at time t=y+200

As hqmax=3 for Resource 4/0/1, three values will be stored.

In step 416 the connectivity is resumed. In step 417, the values stored in the notification queue for Resource 4/0/2 are notified to the server device 20 together with the corresponding time indications. In step 418, the values stored in the notification queue for Resource 4/0/1 are notified to the server device 20 together with the corresponding time indications. In step 419, the receipt of the notification of step 418 is confirmed by the server device 20 to the client device 10.

In the example of FIG. 4, the attributes "con" and "hqmax" are written independently for Resource 4/0/1 and Resource 4/0/2, but it is also possible to write the attributes "con" and "hqmax" for an Object Instance 4/0 which will cause all Resources of that Object Instance to be set to the same value of con and hqmax, or for an Object 4 which will cause all Resources of all Object Instances of the Object to be set to the same value of con and hqmax. For example, a message "Write attributes 4/0? Con=1 hqmax=10" will set con=1 and hqmax=10 for Resource 4/0/1, for Resource 4/0/2 and for any other Resource of the Object Instance 4/0.

Thus, in the example illustrated in FIG. 4, there is provided:
1) a confirmable flag Attribute "con" which is signalled to the client device 10 and associated to a specific type of data (Resource), telling the client device 10 that it should use either confirmable or non-confirmable messages when notifying the server on that particular type of data, thus providing the client device 10 with the ability to use confirmable messaging on data considered more critical, non-confirmable messages on data deemed not critical and the ability to the server device 10 to change this behaviour at any point in the life-time of the installation.
2) a data queueing Attribute which is signalled to the client device 10 and associated to a specific type of data (Resource), telling the device if in the event of loss of connectivity with the server, it should queue it in memory and how many entries it should store in that queue. This allows having different criteria for data queueing depending on the information being transmitted and the ability for the server to change the queue criteria on demand at any point in the lifetime of the client device.

Using the method of any one of the FIGS. 1-4, a client device 10 will receive a set of configuration parameters from a server device 20 that will govern the mechanisms used by the client device 10 to notify the server device 20, e.g. about measurements and/or events detected by the client device 10 in the field. More in particular, values representative for those measurements and/or events (one or more variables) will be notified by the client device 10 to the server device 20. From a central server perspective the relevance of the measurements and/or events reported by any single client device may vary depending on several factors, such as the nature of the data being reported, the availability of alternative sources reporting on the same (or equivalent) data, the state of the system being monitored, the quality of the client server connection, etc. Furthermore, these factors may themselves change in time due to e.g. seasonality, environmental or business related aspects. Using the method of any one of the FIGS. 1-4, the server will be able to set and manipulate on demand, per measurement/event, the mechanisms used by the client device 10 to guarantee the reliability of the notifications sent to the server device 20.

Thus, the two configurable attributes, "con" and "hqmax" may be remotely configured on IoT or M2M devices to dynamically control the characteristics of the notifications triggered by said device. A large portion of IoT and M2M devices, are heavily constraint in terms of CPU and power available to perform computation and communication. The use of "hqmax" is envisioned to allow operators to fine tune the memory resources available on a device by increasing, decreasing or disabling the size of the historical buffer reserved for a given resource or object instance. On the other hand, the enablement of "con=1" attribute, allows the operator to set the IoT or M2M device to adopt a message acknowledgement pattern on notifications, which may be desirable on scenarios of heavy message drop in the network, or to disable acknowledgement "con=0" when network conditions improve or power saving considerations arise.

In further developed embodiment the "hqmax" functionality may be further extended as follows. Once a maximum buffer size for a resource, set by "hqmax" is reached and connectivity is not restored, the following possible actions may be envisioned to optimise buffer usage, i.e. memory usage, for each specific resource:

An M2M device can discard all subsequent notification values of that same resource;

An M2M device may apply a moving window mechanism, in which it discards the oldest values present for that resource in the associated outbound notification queue, to make room for more recent values for that resource;

An M2M device may make room in the notification queue for more recent notifications, by compounding older notifications, for example by discarding consecutive resource values reporting the same content.

Also, with the purpose of further optimizing memory usage within M2M constrained devices, an additional attribute may be considered to define the level of priority that a buffered notification value has when competing with other notification values and no more spare memory exists in the device. The use of such an additional attribute, would for example allow and operator to set a criterion in the device to drop from the memory queue a less important notification value e.g. related to "battery level" in detriment of a more important notification value e.g. related to "fire detection".

Although the examples of FIGS. 3 and 4 relate specifically to an extension of the LwM2M protocol, also other tele-management protocols may be extended in accordance with exemplary embodiments of the invention. Also, within the LwM2M standard, other methods could be pursued to configure in the client device 10 what confirmation and queueing mechanisms should be used per resource. A specific "Resource Notification" object could be used for example to specify and consolidate configurable (per resource) attributes of notifications, containing entries of the type: Resource ID|Confirmable flag|Historical data enabled flag|Max historical data queue|etc. This alternative, would not be re-purposing an existing framework (like on the embodiment of FIGS. 3 and 4 with Notification-Attributes).

Figure 5:
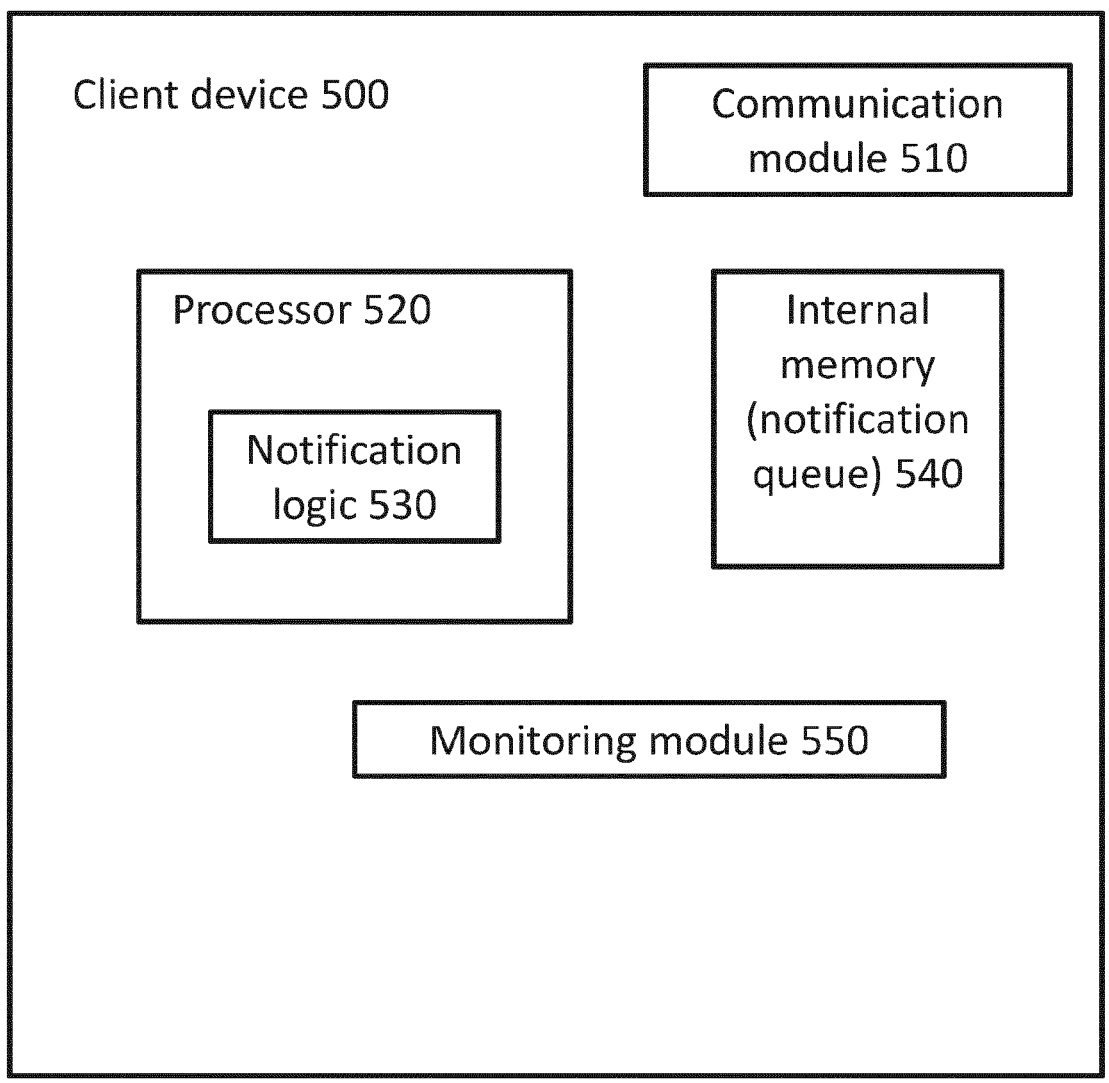
FIG. 5 is an exemplary embodiment of a client device.

FIG. 5 illustrates an exemplary embodiment of a client device 500 configured for providing notifications to a server device. The client device 500 comprises a communication module for communication with a server device, a processor 520 with notification logic 530, an internal memory 540, and a monitoring module 550 for monitoring at least one variable. The notification logic 530 is configured to perform any one of the steps of the methods performed by the client device, which have been set out above.

The client device 500 is configured for receiving through the communication module 510, for at least one variable, one or more predefined configuration parameters including at least one of a confirmation notification parameter indicating at least whether notifications with a value for said at least one variable are to be confirmed, and a notification queue parameter indicating whether historical values for said at least one variable are to be stored in a notification queue and/or indicating a number of historical values for said at least one variable to be stored in a notification queue. The client device 500 is configured for setting or modifying a configuration of the client device to notify values for said at least one variable in accordance with the received one or more predefined configuration parameters, using its processor 520. The client device 500 is further configured for notifying, through the communication module 510, one or more values for said at least one variable to the server device, based on the set or modified configuration of the client device.

The processor 520 may be coupled to an internal memory 540 functioning as the notification queue for storing historical values for the at least one variable, when the connectivity is unavailable or disabled. The processor 520 may be one or more multicore integrated circuits designated for general or specific processing tasks. The internal memory 540 may be a volatile or non-volatile memory, and may also be secure and/or encrypted memory, or unsecure and/or unencrypted memory, or any combination thereof. The client device 500, and in particular the processor 520 with notification logic 530, may be configured such that, when the notification queue parameter indicates that historical values for the at least one variable are to be stored and when the client device is in a non-transmission mode, historical values for the at least one variable are stored in the notification queue 540, and such that, when the client device is re-entering a transmission mode, the one or more historical values stored in the notification queue are notified to the server device. Preferably, the client device 500, and in particular the processor 520 with notification logic 530, is configured to notify the one or more historical values stored in the notification queue 540 together with time indications for the one or more historical values.

The communication module 510 may have one or more radio signal transceivers 806 (e.g., Peanut®, Bluetooth®, Zigbee®, Wi-Fi, LoRaWAN, RF, cellular, etc.) and antennae, for sending and receiving, coupled to each other and/or to the processor 520. The transceiver and antennae may be used with the above-mentioned circuitry to implement the various wireless transmission protocol stacks and interfaces. The communication module 510 may include one or more cellular network wireless modems that enable communication via one or more cellular networks and that are coupled to the processor 520.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media.

The embodiments are also intended to cover computers programmed to perform said steps of the above-described methods.

The functions of the various elements shown in the figures, including any functional blocks labelled as "processors" or "modules", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

The invention claimed is:

1. A method for providing notifications by a client device to a server device, the method comprising performing, by the client device, the steps of:
   receiving, for at least one variable to be monitored by the client device, one or more predefined configuration parameters comprising:
      a confirmation notification parameter indicating at least whether notifications with a value for said at least one variable are to be confirmed; or
      a notification queue parameter related to the storing of one or more historical values for said at least one variable in a notification queue, and preferably indicating whether historical values for said at least one variable are to be stored in a notification queue and/or indicating a number of historical values for said at least one variable to be stored in a notification queue;
   setting or modifying a configuration of the client device to notify values for said at least one variable in accordance with the received one or more predefined configuration parameters; and
   based on the set or modified configuration of the client device, notifying one or more values for said at least one variable to the server device.

2. The method of claim 1, wherein the step of receiving comprises:
receiving, for a first variable to be monitored by the client device, one or more predefined configuration parameters comprising:
a confirmation notification parameter indicating at least whether notifications including a value for said first variable are to be confirmed; or
a notification queue parameter indicating whether historical values for said first variable are to be stored in a notification queue and/or indicating a number of historical values for said first variable to be stored in a notification queue; and
receiving, for a second variable to be monitored by the client device, one or more predefined configuration parameters comprising:
a confirmation notification parameter indicating at least whether notifications including a value for said second variable are to be confirmed; or
a notification queue parameter indicating whether historical values for said second variable are to be stored in a notification queue and/or indicating a number of historical values for said second variable to be stored in a notification queue,
such that the one or more predefined configuration parameters may be set independently for the first variable and the second variable.

3. The method of claim 2, wherein the step of setting or modifying a configuration of the client device comprises setting or modifying a first configuration and a second configuration to notify values for said first variable and said second variable in accordance with the received one or more predefined configuration parameters for said first variable and said second variable, respectively, and
wherein the step of notifying comprises notifying one or more values for said first variable based on the first configuration and notifying one or more values for said second variable based on the second configuration.

4. The method of claim 1, wherein the step of notifying comprises:
sending a value for the at least one variable; and
when the confirmation notification parameter indicates that notifications are to be confirmed, and no confirmation is received, sending again the value of the at least one variable.

5. The method of claim 1, wherein the step of notifying comprises, when the notification queue parameter indicates that historical values for the at least one variable are to be stored:
when the client device is in a non-transmission mode, storing historical values for said at least one variable in a notification queue; and
when the client device is re-entering a transmission mode, notifying one or more historical values stored in the notification queue to the server device.

6. The method of claim 5, wherein historical values for the at least one variable are stored in accordance with a predefined scheme, and wherein optionally the notifying includes sending a notification including the one or more historical values stored in the notification queue as well as time indications for the one or more historical values.

7. The method of claim 1, wherein the one or more predefined configuration parameters include the confirmation notification parameter and the notification queue parameter.

8. The method of claim 1, wherein the one or more predefined configuration parameters further comprise one or more condition parameters that indicate one or more conditions that, if satisfied, trigger the client device to notify the server device.

9. The method of claim 1, wherein the one or more predefined configuration parameters further comprise: a minimum notification period parameter indicating a minimum time between two notifications by the client device; a maximum notification period parameter indicating a maximum time between two notifications by the client device; an upper threshold parameter indicating that the client device must send a notification when a value for the variable is above a threshold; a lower threshold parameter indicating that the client device must send a notification when a value for the variable is below a threshold; a step parameter indicating that the client device must send a notification when a variation of a value of the variable since the last notification is above a minimum change; a minimum evaluation period parameter indicating a minimum time between two evaluations of a notifying criterion by the client device; or a maximum evaluation period parameter indicating a maximum time between two evaluations of a notifying criterion by the client device.

10. The method of claim 8, wherein the step of notifying comprises, when the notification queue parameter indicates that historical values for the at least one variable are to be stored:
when the client device is in a non-transmission mode, storing historical values for said at least one variable in a notification queue; and
when the client device is re-entering a transmission mode, notifying one or more historical values stored in the notification queue to the server device, and
wherein a value for the variable is stored in the notification queue when the one or more conditions indicated by the one or more condition parameters are satisfied.

11. The method of claim 9, wherein the step of notifying comprises, when the notification queue parameter indicates that historical values for the at least one variable are to be stored:
when the client device is in a non-transmission mode, storing historical values for said at least one variable in a notification queue; and
when the client device is re-entering a transmission mode, notifying one or more historical values stored in the notification queue to the server device, and
wherein a value for the variable is stored in the notification queue when one or more conditions indicated by at least one of the upper threshold parameter, the lower threshold parameter, the step parameter, the minimum evaluation period parameter, and the maximum evaluation period parameter, is satisfied.

12. A method for obtaining notifications by a server device from one or more client devices, the method comprising performing, by the server device, the steps of:
sending to a client device, for at least one variable to be monitored by said client device, one or more predefined configuration parameters comprising:
a confirmation notification parameter indicating at least whether notifications with a value for said at least one variable are to be confirmed; or
a notification queue parameter related to the storing of one or more historical values for said at least one variable in a notification queue, and preferably indicating whether historical values for said at least one variable are to be stored by said client device and/or indicating a number of historical values for said at least one variable to be stored in a notification queue; and receiving, from the client device, notifications with one or more values for said at least one variable.

13. The method of claim 12, wherein the step of sending to a client device comprises:

sending, for a first variable to be monitored by the client device, one or more predefined configuration parameters comprising:

a confirmation notification parameter indicating at least whether notifications including a value for said first variable are to be confirmed; or a notification queue parameter indicating whether historical values for said first variable are to be stored and/or indicating a number of historical values for said first variable to be stored in a notification queue; and sending, for a second variable to be monitored by the client device, one or more predefined configuration parameters comprising:

a confirmation notification parameter indicating at least whether notifications including a value for said second variable are to be confirmed; or a notification queue parameter indicating whether historical values for said second variable are to be stored and/or indicating a number of historical values for said second variable to be stored in a notification queue, such that the one or more predefined configuration parameters may be set independently for the first variable and the second variable.

14. The method of claim 13, wherein the step of receiving notifications comprises: receiving notifications with one or more values for said first variable in accordance with the one or more predefined configuration parameters sent for the first variable; and receiving notifications with one or more values for said second variable in accordance with the one or more defined configuration parameters sent for the second variable.

15. The method of claim 12, further comprising, when the confirmation notification parameter indicates that notifications are to be confirmed, sending a confirmation message to the client device.

16. The method of claim 12, wherein the one or more predefined configuration parameters further comprise one or more condition parameters that indicate one or more conditions that, if satisfied, trigger the client device to notify the server device and/or to store a value in the notification queue.

17. The method of claim 1, wherein the confirmation notification parameter comprises a flag which indicates whether notifications are to be confirmed.

18. The method of claim 1, wherein the at least one variable comprises at least a first variable and a second variable, wherein the one or more predefined notification parameters comprise at least one priority parameter defining a level of priority for said first variable and said second variable, and wherein values for said first variable and said second variable are stored or discarded in a notification queue taking into account said at least one priority parameter.

19. A client device configured for providing notifications to a server device, the client device being configured for monitoring at least one variable, and being further configured for:

receiving, for at least one variable, one or more predefined configuration parameters comprising:

a confirmation notification parameter indicating at least whether notifications with a value for said at least one variable are to be confirmed; or a notification queue parameter related to the storing of one or more historical values for said at least one variable in a notification queue, and preferably indicating whether historical values for said at least one variable are to be stored in a notification queue and/or indicating a number of historical values for said at least one variable to be stored in a notification queue;

setting or modifying a configuration of the client device to notify values for said at least one variable in accordance with the received one or more predefined configuration parameters; and based on the set or modified configuration of the client device, notifying one or more values for said at least one variable to the server device.

20. A server device for obtaining notifications from one or more client devices, said server device being configured for:

sending to a client device, for at least one variable to be monitored by said client device, one or more predefined configuration parameters comprising:

a confirmation notification parameter indicating at least whether notifications with a value for said at least one variable are to be confirmed; or a notification queue parameter related to the storing of one or more historical values for said at least one variable in a notification queue, and preferably indicating whether historical values for said at least one variable are to be stored by said client device and/or indicating a number of historical values for said at least one variable to be stored in a notification queue; and receiving, from the client device, notifications with one or more values for said at least one variable.

21. A luminaire comprising the client device according to claim 19.

22. A luminaire system comprising at least one luminaire according to claim 21 and a server device for obtaining notifications from one or more client devices, said server device being configured for:

sending to a client device, for at least one variable to be monitored by said client device, one or more predefined configuration parameters comprising:

a confirmation notification parameter indicating at least whether notifications with a value for said at least one variable are to be confirmed; or a notification queue parameter related to the storing of one or more historical values for said at least one variable in a notification queue, and preferably indicating whether historical values for said at least one variable are to be stored by said client device and/or indicating a number of historical values for said at least one variable to be stored in a notification queue; and receiving, from the client device, notifications with one or more values for said at least one variable.

* * * * *